United States Patent
Letocha et al.

(10) Patent No.: US 9,146,905 B2
(45) Date of Patent: Sep. 29, 2015

(54) GENERATING PAGE-ORIENTED DATA FOR PRINTING DYNAMIC DOCUMENTS

(75) Inventors: Boris Letocha, Hradec Kralove (CZ); Jan Knoulich, Hradec Kralove (CZ)

(73) Assignee: GMC SOFTWARE AG (CH)

( * ) Notice: Subject to any disclaimer, the term of this patent is extended or adjusted under 35 U.S.C. 154(b) by 1087 days.

(21) Appl. No.: 12/433,252

(22) Filed: Apr. 30, 2009

(65) Prior Publication Data

US 2010/0110495 A1  May 6, 2010

(30) Foreign Application Priority Data

Nov. 6, 2008 (CH) .................................... 1740/08

(51) Int. Cl.
*G06F 17/21* (2006.01)
*G06F 17/24* (2006.01)
*G06F 3/12* (2006.01)

(52) U.S. Cl.
CPC .............. *G06F 17/211* (2013.01); *G06F 3/122* (2013.01); *G06F 3/1215* (2013.01); *G06F 3/1243* (2013.01); *G06F 3/1282* (2013.01); *G06F 17/248* (2013.01); *G06F 3/125* (2013.01); *G06F 3/1205* (2013.01)

(58) Field of Classification Search
CPC .............................. G06F 3/122; G06F 3/1265
USPC ............................................................ 707/1
See application file for complete search history.

(56) References Cited

U.S. PATENT DOCUMENTS

| | | | |
|---|---|---|---|
| 5,923,013 A * | 7/1999 | Suzuki et al. ................ | 358/1.18 |
| 7,127,520 B2 | 10/2006 | Ladd et al. | |
| 2001/0047369 A1 | 11/2001 | Aizikowitz et al. | |
| 2002/0049702 A1 * | 4/2002 | Aizikowitz et al. ............... | 707/1 |
| 2003/0189724 A1 * | 10/2003 | Kloosterman et al. ....... | 358/1.18 |
| 2003/0189725 A1 * | 10/2003 | Kloosterman et al. ....... | 358/1.18 |
| 2003/0189726 A1 * | 10/2003 | Kloosterman et al. ....... | 358/1.18 |
| 2003/0189727 A1 * | 10/2003 | Kloosterman et al. ....... | 358/1.18 |
| 2004/0066527 A1 * | 4/2004 | Kloosterman et al. ....... | 358/1.15 |
| 2005/0050442 A1 | 3/2005 | Pope et al. | |

(Continued)

FOREIGN PATENT DOCUMENTS

| | | |
|---|---|---|
| EP | 0 837 401 A | 4/1998 |
| EP | 0837401 A | 4/1998 |

(Continued)

OTHER PUBLICATIONS

European Search reported EP 09 00 5555, dated Dec. 11, 2012.

*Primary Examiner* — Nicholas Pachol
(74) *Attorney, Agent, or Firm* — Ostrolenk Faber LLP

(57) ABSTRACT

For generating from variable data page-oriented data for printing dynamic documents, a layout module (13) is linked in series with one or more data processing modules (121, 122) to a data input module (11). The data input module (11) loads (S3) a part of the variable data into local memory and passes it by reference through the data processing modules (121, 122) to the layout module (13). The data processing modules (121, 122) are configured to read (S8c, S13c, S13f) a data field from the variable data in the local memory only in cases where the data field is to be processed by the respective data processing module. The layout module (13) generates (S8) the page-oriented data output from unprocessed and pre-processed data fields, defined in each case by a respective pointer from the data processing modules. Thereby, allocation and de-allocation of local memory is reduced and performance improved.

20 Claims, 6 Drawing Sheets

(56) References Cited

U.S. PATENT DOCUMENTS

| | | | |
|---|---|---|---|
| 2005/0160362 A1* | 7/2005 | Obradovic et al. | 715/527 |
| 2006/0023238 A1* | 2/2006 | Blaszyk et al. | 358/1.13 |
| 2006/0106662 A1* | 5/2006 | Palop et al. | 705/8 |
| 2007/0055925 A1* | 3/2007 | Giannetti | 715/511 |
| 2008/0074685 A1* | 3/2008 | Sakamoto | 358/1.9 |
| 2008/0259387 A1* | 10/2008 | Hirai | 358/1.15 |
| 2008/0266605 A1* | 10/2008 | Nishide | 358/1.17 |
| 2009/0051947 A1* | 2/2009 | Kuroshima | 358/1.15 |
| 2009/0153905 A1* | 6/2009 | Cyman et al. | 358/1.18 |
| 2009/0310156 A1* | 12/2009 | Yamazaki | 358/1.9 |

FOREIGN PATENT DOCUMENTS

| | | |
|---|---|---|
| EP | 1 102 204 A | 5/2001 |
| EP | 1102204 A | 5/2001 |

\* cited by examiner

GENERATING PAGE-ORIENTED DATA FOR PRINTING DYNAMIC DOCUMENTS

BACKGROUND

1. Field of the Disclosure

The present application relates to a computer system and a computer-implemented method for generating page-oriented data for printing dynamic documents. Specifically, the present invention relates to a computer system and a computer-implemented method for generating, from variable data stored in a data store, page-oriented data output for printing dynamic documents, whereby the variable data is pre-processed by one or more data processing modules prior to generating the page-oriented data.

2. Related Art

There are many data processing applications where data is retrieved from a data store and processed at various processing stages, before it is passed to a data consumer which generates some output based on this pre-processed data. Typical data stores include local or remote (networked) hard disks, data tape, or removable data carriers such as compact discs (CD), digital versatile disks (DVD) or flash memory devices. Particularly, in data processing applications, such as dynamic and high speed printing based on variable data, where different processing modules with different processing functions can be selected and combined freely for pre-processing the data, at each processing stage, the variable data is typically loaded as a complete data set from the data store into the local memory of the computerized processing system. For example, the variable data is loaded completely into random access memory (RAM). After data processing is completed at a processing stage, the processed data is stored back into the data store. Thus, at each processing stage, computer resources and time are used for allocating/de-allocating local memory, and transferring data between the data store and the local memory. In some applications it may be possible to reduce data transfer between the data store and the local memory, if the different processing modules are designed to use the local memory for passing data from one processing stage to the next. Nevertheless, using the local memory for transferring data between processing modules requires additional memory space and necessitates allocation/de-allocation of local memory at each processing stage. However, dynamic printing applications which generate page oriented data output based on variable data input, require typically a high performance throughput for handling high volumes of data records and corresponding page output. For example, printing of variable information letters and/or invoices directed to subscribers of a telecom provider, or other personalized mass mailing applications, may involve hundreds of thousands or even millions of records and corresponding print pages. For each individual page to be printed, page-oriented data is generated from variable data, e.g. address, invoice and/or other custom-oriented information associated with individual persons, whereby the page-oriented data defines a layout of a page including the placement of properly formatted data fields derived from the variable data. For example, the page-oriented data output is in the form of a print stream such as Adobe PDF (Portable Document Format) as defined in ISO 32000-1:2008, Adobe PostScript, IBM AFPDS (Advanced Function Presentation Data Streaming), PPML (Personalized Print Markup Language), IJPDS (InkJet Printer Data Stream), or other representations of two-dimensional documents. On one hand, great flexibility may be obtained from selecting and combining various processing modules for pre-processing the variable data, prior to generating the page-oriented data output, e.g. for filtering, formatting and merging the variable data into a page-oriented layout. On the other hand, performance and throughput are reduced by the data exchange taking place between individual modules and the data store, as well as the allocation and de-allocation of local memory performed at the individual processing stages. However, the page-oriented data output must be generated fast enough to support high speed printing systems. Particularly, the pre-processing and merging of the variable data into the page-oriented layout needs to be performed fast enough to keep the printer system running continuously throughout a defined production period, e.g. several hours or even a whole day. Thus, in the known methods for generating from variable data page-oriented data for printing dynamic documents there is a tradeoff between flexible pre-processing of the variable data at run-time (during production) and fast, continuous printing of the dynamic documents.

U.S. Pat. No. 7,127,520 describes a system for transforming an input data stream of one format into an output data stream of another format. According to U.S. Pat. No. 7,127,520, various input connector modules receive input data streams and are each connected to one of several input queues which store the input data stream. Filters are used to remove irrelevant data from the received input data streams. Several job threads format in parallel the input data streams to produce output data streams which are stored in output queues. Thread job managers detect events in the input data stream and generate messages associated with the detected events. Based on the messages, the output data streams are produced and stored in output queues. For example, a "pageout" process produces page layout for creating documents for printing or faxing.

US 2005/0050442 describes a system for generating customized documents using dynamic information selected from a database based on a customer's business rules and specific transaction data, e.g. a customer's name and/or address. The transaction data is received through batch data files available through FTP (File Transfer Protocol) servers and/or web-enabled interactive ordering systems. When a complete set of content is assembled for a transaction, a dynamic document generator and assembler assembles the customized document.

US 2002/0049702 describes a method for creating a series of customized document instances from a single dynamic variable information document, referred to as dynamic document. A dynamic document includes a dynamic document template with placeholders indicating the location where dynamic objects are to be placed. According to US 2002/0049702, a dynamic document is associated with a plurality of pointers to a plurality of data sources such as database data and media items. Specifically, the values to be associated with a dynamic object are defined in terms of logical tables and attributes of their records, or references to external systems such as a file name or an URL (Uniform Resource Locator) identifying a content object.

EP 0837401 describes a method for creating complex layouts with variable data for high speed variable data printing, e.g. using ink jet or laser jet systems printing on paper moving at the speed of up to 305 meters per minute. A merge software performs data reformatting functions, such as case conversion or word concatenation, and re-flows text based on variable data insertion, associating fields in variable data records with variable data placeholders for appropriate locations in a layout template. User callable program routines can be linked to the merge software for performing custom user functions.

US 2001/0047369 describes a three stage pipeline process for generating dynamic documents. At the first stage, a data iterator performs a data processing task by selecting the next record from a recipients list and computing the set of page layouts and content objects needed for this instance. The result of the computation is forwarded to a document instantiator via a content objects buffer. The data iterator continues the data processing task as long as the recipients list has not been exhausted and the buffer storage is not full. At the second stage, the document instantiator retrieves the next collection of layouts and content objects from the content objects buffer, and employs the appropriate layout engine for creating the specific document instance and code specifying the rendering of the document instance. At the third stage, a merge processor generates an output stream based on the code specifying the rendering of the document instance.

SUMMARY

It is an object of this invention to provide a computer system and a computer-implemented method for generating from variable data page-oriented data for printing dynamic documents, which system and method enable a flexible selection of various processing modules for pre-processing sequentially the variable data, prior to generating the page-oriented data output, at a pace fast enough to keep the printer system running continuously throughout a defined production period. In particular, it is an object of the present invention to provide a computer system and a computer-implemented method which enable a flexible configuration of the pre-processing modules while keeping low the transfer of variable data between a data store and local memory, as well as the allocation/de-allocation of local memory used for accessing and processing the variable data.

According to the present invention, at least some of these objects are achieved particularly through the features of the independent claims. In addition, further advantageous embodiments follow from the dependent claims and the description.

According to the present invention, the above-mentioned objects are particularly achieved in that for generating page-oriented data output for printing dynamic documents, from variable data stored in a data store, a layout module is linked in series with one or more data processing modules to a data input module. A part of the variable data is loaded by the data input module from the data store into local memory of the computer system which generates the page-oriented data from the variable data. For example, to initiate data processing, a request for data is issued by the layout module and forwarded from the layout module through the data processing modules to the data input module, and the data input module loads the variable data from the data store into local memory in response to this request for data. Thus, the request for data is forwarded by each of the date processing modules to the preceding data processing or data input module, respectively. The variable data is passed by reference from the data input module through the data processing modules to the layout module, using in each case a pointer to the part of the variable data loaded in the local memory. The data processing modules read a data field from the variable data loaded in the local memory only in cases where the data field is configured to be processed by the respective data processing module. In such cases, the respective data processing module generates pre-processed variable data from the data field. Otherwise, if the data field is not specified to be processed by the respective data processing module, the data processing module merely forwards the data field by passing on the pointer to the subsequent data processing module or layout module, respectively, without either reading or processing the data field. Subsequently, the page-oriented data output is generated by the layout module from pre-processed variable data and (unprocessed) variable data loaded by the data input module, using in each case the respective pointer received from the data processing module linked directly to the layout module. Passing on the variable data by reference and limiting memory access to those data processing modules specified to process a specific data field has the advantage that allocation and de-allocation of local memory is reduced to instances and times, where the respective data field needs be processed by a data processing module. Thus, no resources are used for reading the variable data from the local memory by a data processing module when the respective data processing module is specified to forward a specific data field without further processing to a subsequent data processing or layout module. Thus, a plurality of different data processing modules can be flexibly linked in series for sequential processing of the variable data, without wasting resources for memory allocation/de-allocation, in each case where a data field is not specified to be processed by one of data processing modules.

In a preferred embodiment, in cases where the data field is configured to be processed by the respective data processing module, the respective data processing module stores the pre-processed variable data in the local memory separate from the variable data loaded by the data input module, and uses a pointer to the pre-processed variable data for passing the pre-processed variable data by reference to the layout module. Storing a separate copy of the pre-processed data field, rather than overwriting the original data field with the pre-processed data, has the advantage that various data processing modules can be forked and processed in parallel (forked threads), the data processing modules of each fork having access to the original, unprocessed data field in the local memory.

In an embodiment, there are data processing modules configured to perform a combined (multi-field) operation on more than one data field. In such cases, the respective data processing module generates pre-processed variable data from these data fields, stores the pre-processed variable data in the local memory, and uses a pointer to the pre-processed variable data for passing the pre-processed variable data by reference to the layout module.

Preferably, the variable data is loaded from the data store record by record and at least one data field of a record is loaded at a time. The variable data is passed field by field by the data input module through the data processing modules to the layout module, using in each case a pointer to the data field loaded in the local memory. The data processing modules read the loaded data field from the local memory only in cases where the loaded data field is configured to be processed by the respective data processing module, and in such cases the respective data processing module generates from one or more of the loaded data fields a pre-processed data field, stores the pre-processed data field in the local memory, and uses a pointer to the pre-processed data field, instead of the pointer to the loaded data field, for passing the pre-processed data field by reference to the layout module. Subsequently, the layout module generates the page-oriented data output from loaded data fields and pre-processed data fields associated with a record, using in each case the respective pointer to the loaded (unprocessed) data field or pre-processed data field, respectively, received from the data processing module linked directly to the layout module. Thus the data input module is configured to drive the data fields by reference sequentially through the series of data processing modules to the layout module, the reference (pointer) only being replaced when a pre-processed version of a data field is generated by a data processing module.

In a further embodiment, the variable data is loaded from the data store record by record, each data record having a hierarchical structure. The data fields associated with one hierarchical level of a record are loaded into the local memory at a time. An indication of the current hierarchical level is communicated from the data input module through the data processing modules to the layout module. For example, the current hierarchical level is communicated by the data input module forwarding through the data processing modules to the layout module sink commands for descending to a lower hierarchical level, and raise commands for ascending to a higher hierarchical level. Preferably, the variable data is loaded from the data store record by record, the data processing modules are provided with information about the structure of the record, and the pointer includes an index for identifying a data field with reference to the structure of the record. Thus, having access to information about the data structure of a data record, the data processing and layout modules are in a position to determine efficiently the data field currently processed based on the sink and raise commands and an index to the respective field.

In addition to the computer system and the computer-implemented method for generating page-oriented data output for printing dynamic documents, from variable data stored in a data store, the present invention also relates to a computer program product comprising computer program code means for controlling one or more processors of a computer system, preferably a computer program product comprising a computer-readable medium containing the computer program code means therein.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
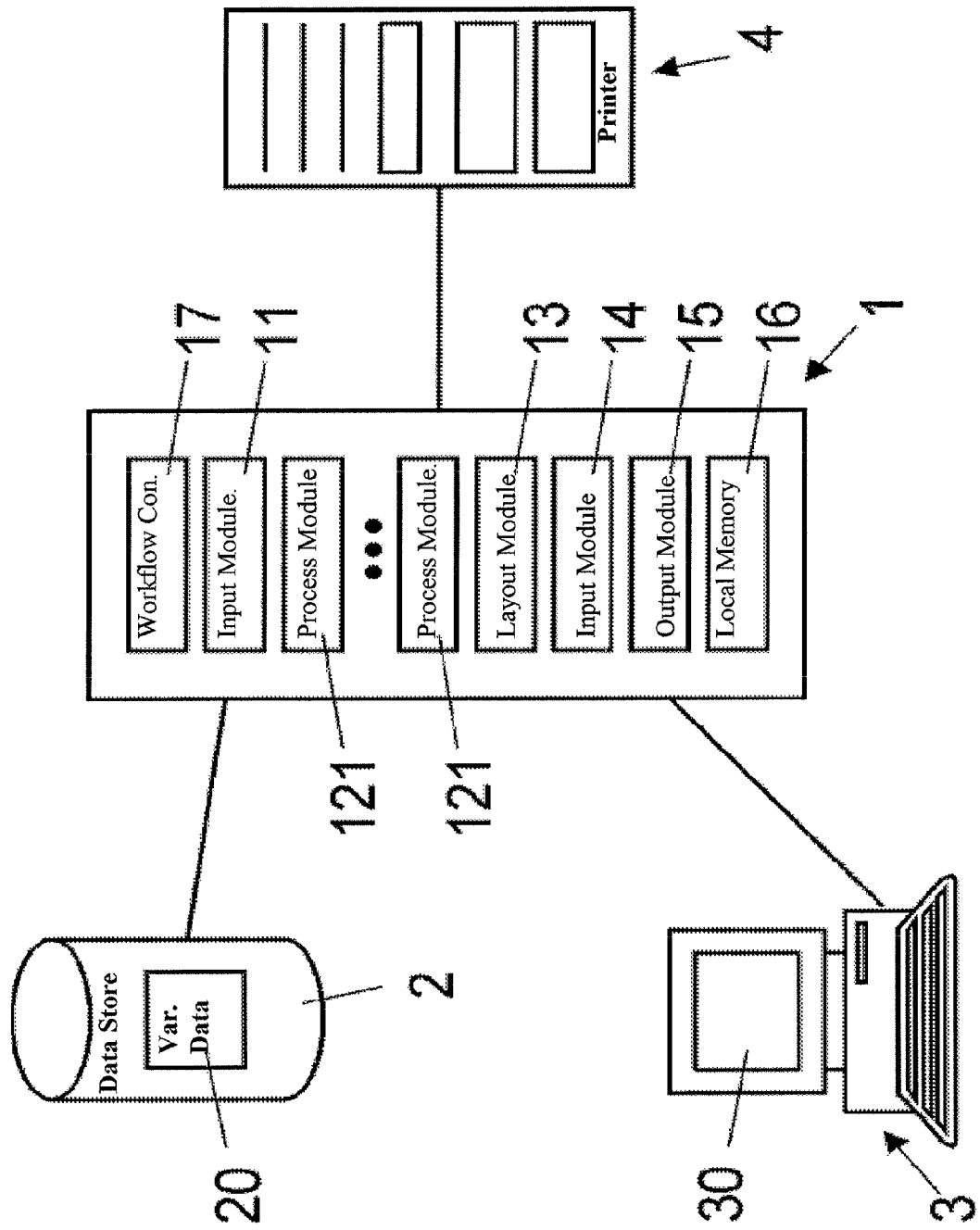
FIG. 1 shows a block diagram illustrating schematically a computer system for generating from variable data page-oriented data output for printing dynamic documents.

In FIG. 1, reference numeral 1 refers to an exemplary configuration of a computer system for generating from variable data 20 page-oriented data output for printing dynamic documents. Computer system 1 comprises one or more computers, each having one or more processors, and is connected to a data store 2, an operator terminal 3, and a printer 4. Computer system 1 further comprises local memory 16, e.g. RAM, a workflow configuration 17, and various functional modules, namely at least one data input module 11, one or more data processing modules 121, 122, one or more layout modules 13 and optionally one or more imposition modules 14 and output modules 15. Preferably, the functional modules are implemented as programmed software modules comprising computer program code which is stored on a computer-readable medium arranged in a fixed or removable fashion.

The data store 2 includes one or more hard disks, data tapes, and/or removable data carriers such as compact discs (CD), digital versatile disks (DVD) or flash memory devices for storing the variable data 20. Preferably, the variable data 20 is organized as a data file of a plurality of data records, each data record having a data structure with one or more data fields. Preferably, the data records are organized with a hierarchical data structure, having more than one hierarchical level; for example, the variable data 20 is defined in an XML file (Extensible Markup Language).

In a scenario where computer system 1 is configured to generate the page-oriented data output from variable data 20 provided through an online document composition process, e.g. over the Internet, printer 4 is a conventional laser or inkjet printer, for example. In industrial batch printing applications, however, printer 4 is preferably a high speed printer configured for continuous feed. For example high speed printers are configured to print at speeds of at least 100 pages/minute, preferably at speeds of 1000-1500 pages/minute or even faster, with future improvements in printer manufacturing. For industrial application, these high speed printers are configured to operate at continuous feed over several days, weeks, or even months. In a further embodiment, printer 4 comprises more than one printer unit which operate and print in parallel and thus increase even further the overall printing throughput. For continuously feeding printer 4, computer system 1 is configured to generate the page-oriented data output faster (or at least as fast) as the print speed of printer 4. For example, using computers with conventional processing power and disk speed, computer system 1 is configured to generate page-oriented data for about 30000 pages/minute; with increased processing power and faster disks, computer system 1 is configured to generate page-oriented data for about 40000 pages/minute.

As illustrated schematically in FIG. 1, the operator terminal 3 comprises data entry elements, such as a keyboard and/or a pointing device, as well as a display 30 for displaying data input/output through graphical user interfaces.

The workflow configuration 17 is defined and stored by a workflow configuration tool running on computer system 1 or operator terminal 3. The workflow configuration tool is configured to receive from a human operator instructions for configuring a workflow for generating from the variable data 20 page-oriented data output for printing dynamic documents. Preferably, the workflow is configured by the operator via a graphical user interface shown on display 30.

Figure 2:
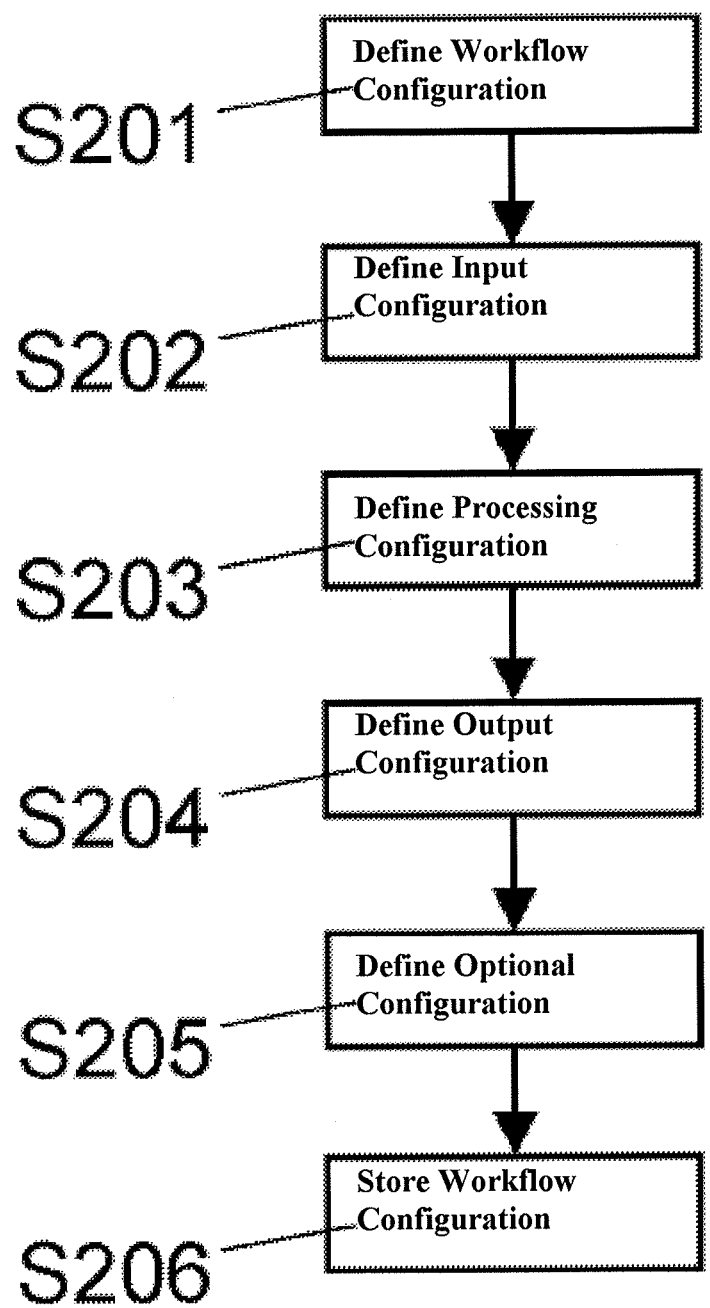
FIG. 2 shows a flow diagram illustrating an exemplary sequence of preparatory steps for configuring a workflow for generating the page-oriented data output from variable data.

As illustrated in FIG. 2, in step S201, the workflow configuration 17 is defined by the operator selecting, e.g. from a list, at least one data input module, one or more data processing modules, one or more layout modules, as well as optional imposition and output modules. For example, the selected modules are arranged and linked by way of drag and drop operations in a user interface with graphical representation.

Figure 3:
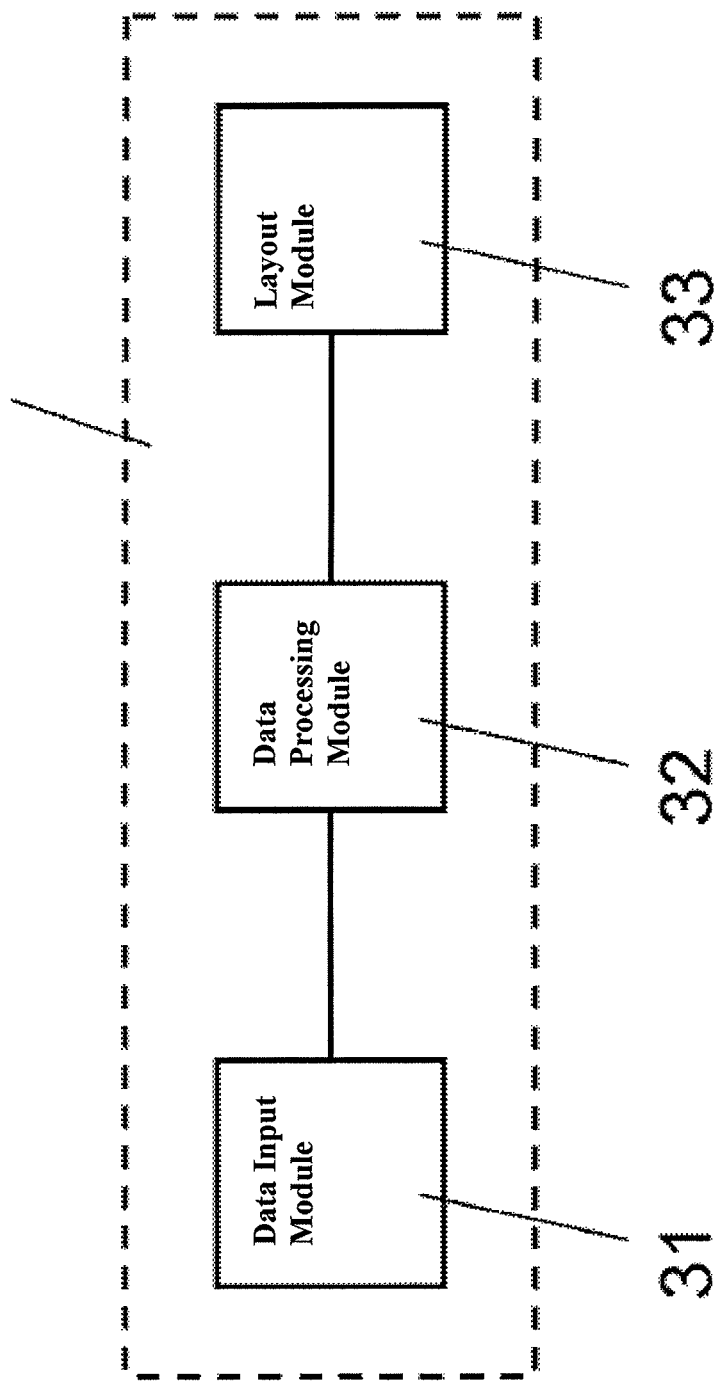
FIG. 3 shows a block diagram illustrating an example of a basic configuration for generating the page-oriented data output for printing dynamic documents.

FIG. 3 shows a graphical representation (e.g. shown on display 30) of an example of a basic workflow configuration 17, comprising one data input module 31 and one layout module 33 interconnected by one data processing module 32.

Figure 4:
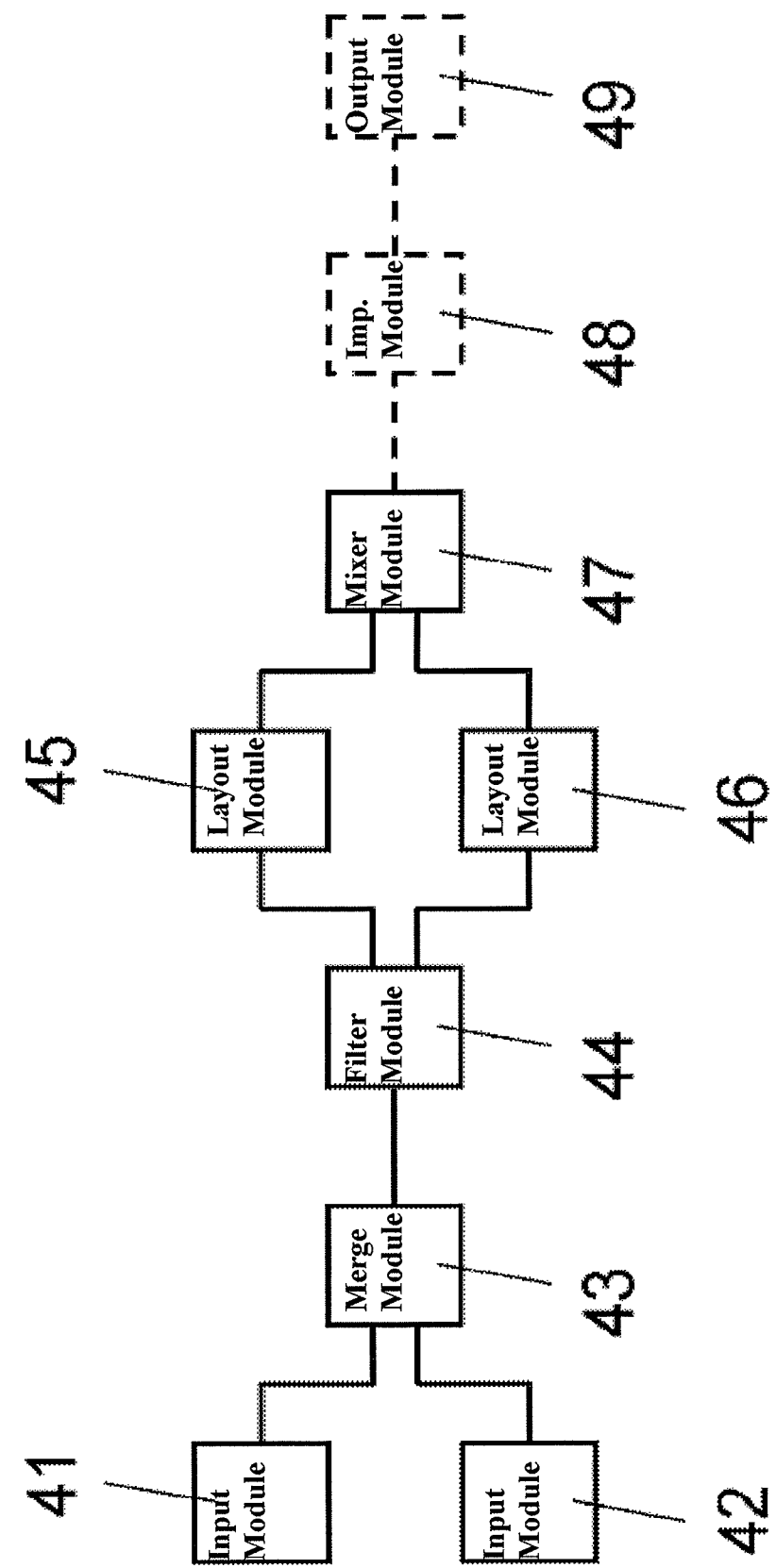
FIG. 4 shows a block diagram illustrating an example of a more complex configuration for generating the page-oriented data output.

FIG. 4 shows a graphical representation (e.g. shown on display 30) of an example of a more complex workflow configuration 17, comprising two data input modules 41, 42, linked via two sequential data processing module 43, 44, e.g. a merging module and filter module, to two layout modules 45, 46. The layout modules 45, 46 are connected via a mixer module 47 to optional imposition module 48. The imposition module 48 is connected to optional output module 49 controlling the printer 4.

Thus, a workflow configuration 17 includes typically a data input module 11, 41, 42 linked through a series of one or more data processing modules 32, 43, 44, 121, 122 to a layout module 13, 33, 45, 46.

The data input modules 11, 41, 42 are configured to load the variable data 20 from data store 2 into local memory 16. As will be explained later in more detail, the data input modules 11, 41, 42 are configured to load the variable data 20, in response to a request for data received from the subsequent data processing module 32, 43, 121 which is linked directly as a successive module to the respective data input module 11, 41, 42. Furthermore, the data input modules 11, 41, 42 are configured to forward the variable data 20 by reference to the subsequent data processing modules 32, 43, 121 which are linked as successive modules to the respective data input module 11, 41, 42, using in each case a pointer to the variable data loaded in the local memory 16. Preferably, the data input modules 11, 41, 42 are configured to load the variable data 20 record by record. For example, all data fields associated with a hierarchical level of a record are loaded at a time. Preferably, the data input modules 11, 41, 42 are configured to forward the variable data 20 field by field, using in each case a pointer to the data field loaded in the local memory 16. The data input modules 11, 41, 42 are configured to communicate to the data processing modules 32, 43, 44, 121, 122 the hierarchical level processed by passing through the data processing modules 32, 43, 44, 121, 122 sink commands for descending to a lower hierarchical level of the record currently, and raise commands for ascending to a higher hierarchical level of the record. The data input modules 11, 41, 42 are further configured to communicate to the data processing modules 32, 43, 44, 121, 122 the data field currently processed by passing through the data processing modules 32, 43, 44, 121, 122 so called set field commands which include a pointer to the local memory 16 and an index for identifying the data field with reference to the structure of the data record.

The data processing modules 32, 43, 44, 121, 122 are configured to (pre-) process the variable data 20 loaded in the local memory 16 according to various functions or operations associated in each case with the respective processing module 32, 43, 44, 121, 122. As will be explained later in more detail, the data processing modules 32, 43, 44, 121, 122 are further configured to receive requests for data from a subsequent data processing 44, 122 or layout module 13, 33, 45, 46 which is linked directly as a successive module to the respective data processing module 32, 43, 44, 121, and to forward the request for data to the preceding data input 11, 41, 42 or data processing module 43, 121, which is linked directly as an anterior module to the respective data processing module 32, 44, 122. Furthermore, the data processing modules 32, 43, 44, 121, 122 are configured to receive the variable data 20 by reference from the preceding data input 11, 41, 42 or data processing module 32, 43, 121 which is linked directly as an anterior module to the respective data processing module 32, 43, 44, 121, 122, and to forward the variable data 20 by reference to the subsequent data processing 44, 122 or layout module 13, 33, 45, 46 which is linked directly as a successive module to the respective data processing module 32, 43, 44, 121, 122. The data processing modules 32, 43, 44, 121, 122 are configured to read the variable data from the local memory 16, only if the configuration of the respective data processing module 32, 43, 44, 121, 122 specifies the respective field to be processed by the respective data processing module 32, 43, 44, 121, 122. For such cases, the data processing modules 32, 43, 44, 121, 122 are configured to generate pre-processed variable data from the variable data, to store the pre-processed variable data in the local memory 16 separate from the variable data loaded by the data input module 11, 41, 42, and to use a pointer to the pre-processed data field, instead of the pointer to the loaded data field, for passing the pre-processed data field by reference to the subsequent data processing module 44, 122 or layout module 13, 33, 45, 46.

The layout modules 13, 33, 45, 46 are configured to assign one or more data fields of the variable data 20 in each case to a location or placeholder of a document layout. As explained later in more detail, the layout modules 13, 33, 45, 46 are configured as process drivers, initiating data processing by requesting data from preceding data processing modules 44, 122 linked to the layout module 13, 33, 45, 46. Furthermore, the layout modules 13, 33, 45, 46 are configured to receive the variable data 20 by reference from the preceding data processing module 32, 43, 121 which is linked directly as an anterior module to the respective layout module 13, 33, 45, 46, and to read the variable data from the local memory 16, by using in each case the received pointer to the pre-processed data field stored in the local memory 16 or the unprocessed data field loaded in the local memory 16. Based on document layout and/or template definitions, the layout modules 13, 33, 45, 46 are configured to generate the page-oriented data output from the unprocessed and pre-processed variable data read from the local memory 16.

Preferably, communication between data input modules 11, 41, 42, data processing modules 32, 43, 44, 121, 122, and layout modules 13, 33, 45, 46 is implemented through interface calls to object interfaces associated with the input modules 11, 41, 42, data processing modules 32, 43, 44, 121, 122, and layout modules 13, 33, 45, 46.

The data input modules 11, 41, 42, the data processing modules 32, 43, 44, 121, 122, and the layout modules 13, 33, 45, 46 are provided with or configured to automatically determine information about the data structure of a record of the variable data 20.

The imposition modules are configured to associate the page-oriented data output to actual production size paper, e.g. a continuous lane from a paper roll, having a width with more than one page next to each other.

The output modules are configured to connect and control the printer 4, and/or to generate a spool file for the printer 4. The output modules are configured to feed the page-oriented data output to peripheral devices such as printer 4 or display 30, and thus to print and/or display dynamic documents based on the page-oriented data output. Depending on the embodiment, functions of the imposition and/or output modules may be incorporated into the layout modules.

In step S202, the operator defines the configuration of the data input module 11, 31, 41, 42 selected in step S201. Specifically, the data input module 11, 31, 41, 42 is associated with a specific file of variable data 20 on a defined data store 2. Furthermore, specified are the data fields of a variable data record to be loaded by the data input module 11, 31, 41, 42.

In step S203, the operator defines the configuration of the data processing module(s) 32, 43, 44, 121, 122 selected in step S201. Specifically, the data field(s) to be processed by the respective data processing module are selected, and one or more operations to be performed on the selected data fields are specified. For example, the data processing module 32 may be a data transformer configured to perform various transformations on a selected data field, e.g. reformat a selected field (upper case, lower case, bold, italic, etc.), to perform a combined (multi-field) operation on more than one fields, e.g. concatenate several selected fields, or to perform various other functions on one or more selected data fields. The data processing module 43 is a merge module configured to combine selected data fields provided by different data input modules 41, 42. The data processing module 44 is a filter module configured to filter selected data fields according to specified filter criteria. Other data processing modules may include text replacing or inserting modules. In an embodiment, there are data processing modules 32, 43, 44, 121, 122 configured to process more than one data field at a time, e.g. data sorting modules, data concatenating modules, data minimum and/or maximum selecting modules, data merging modules, and/or data grouping or ungrouping modules.

In step S204, the operator defines the configuration of the layout module(s) 13, 33, 45, 46. Specifically, the data field(s) to be included in the page-oriented output are selected and associated in each case with a location or placeholder of a defined document layout or template.

Subsequently, in step S205, optional post layout modules such as mixer module 47, imposition module 48, or output module 49 are configured by the operator.

In step S206, the defined workflow configuration 17 is stored on computer system 1, including the configuration of the respective functional modules.

Figure 5:
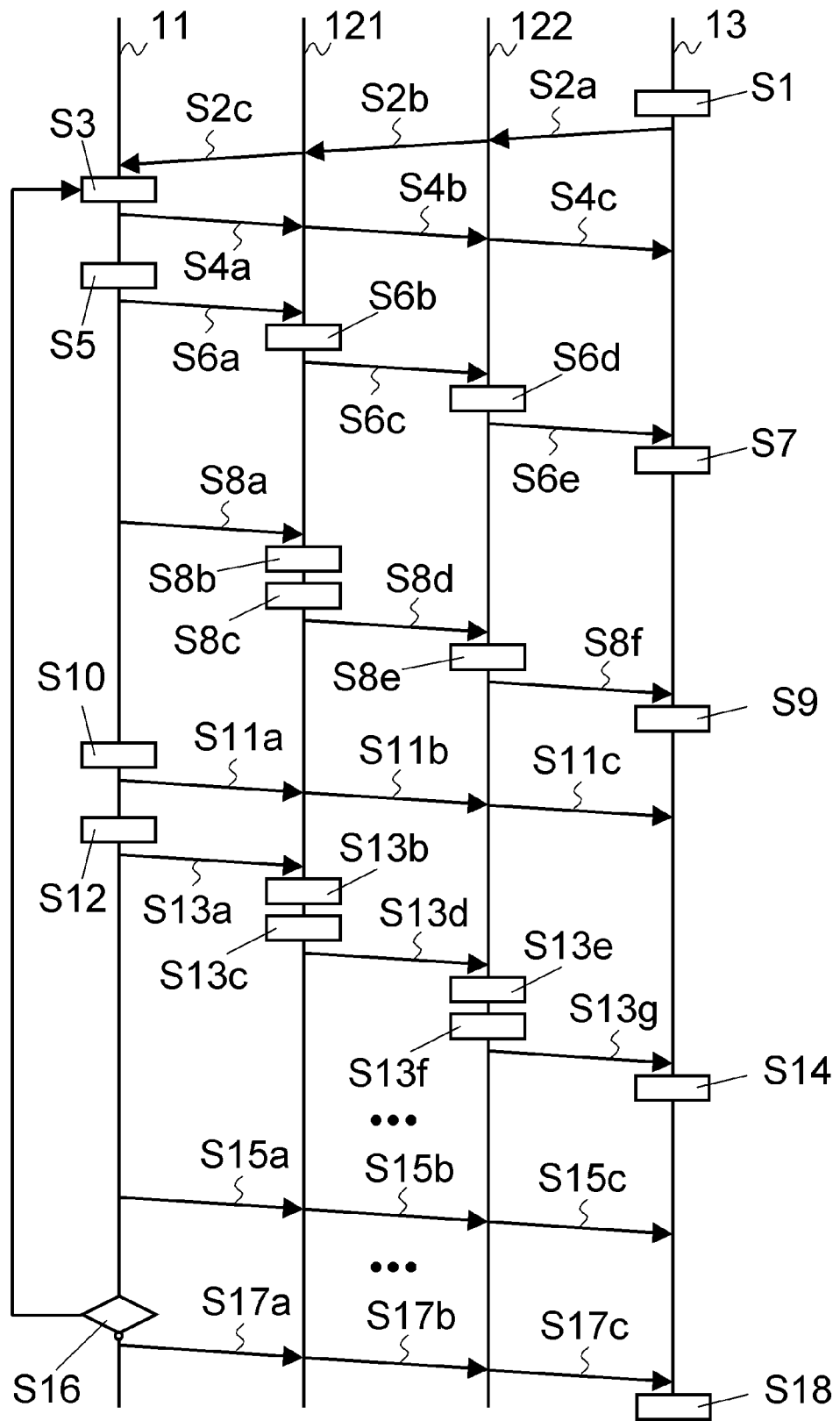
FIG. 5 shows a timing diagram illustrating an exemplary sequence of steps for generating from variable data page-oriented data output for printing dynamic documents.
Figure 6:
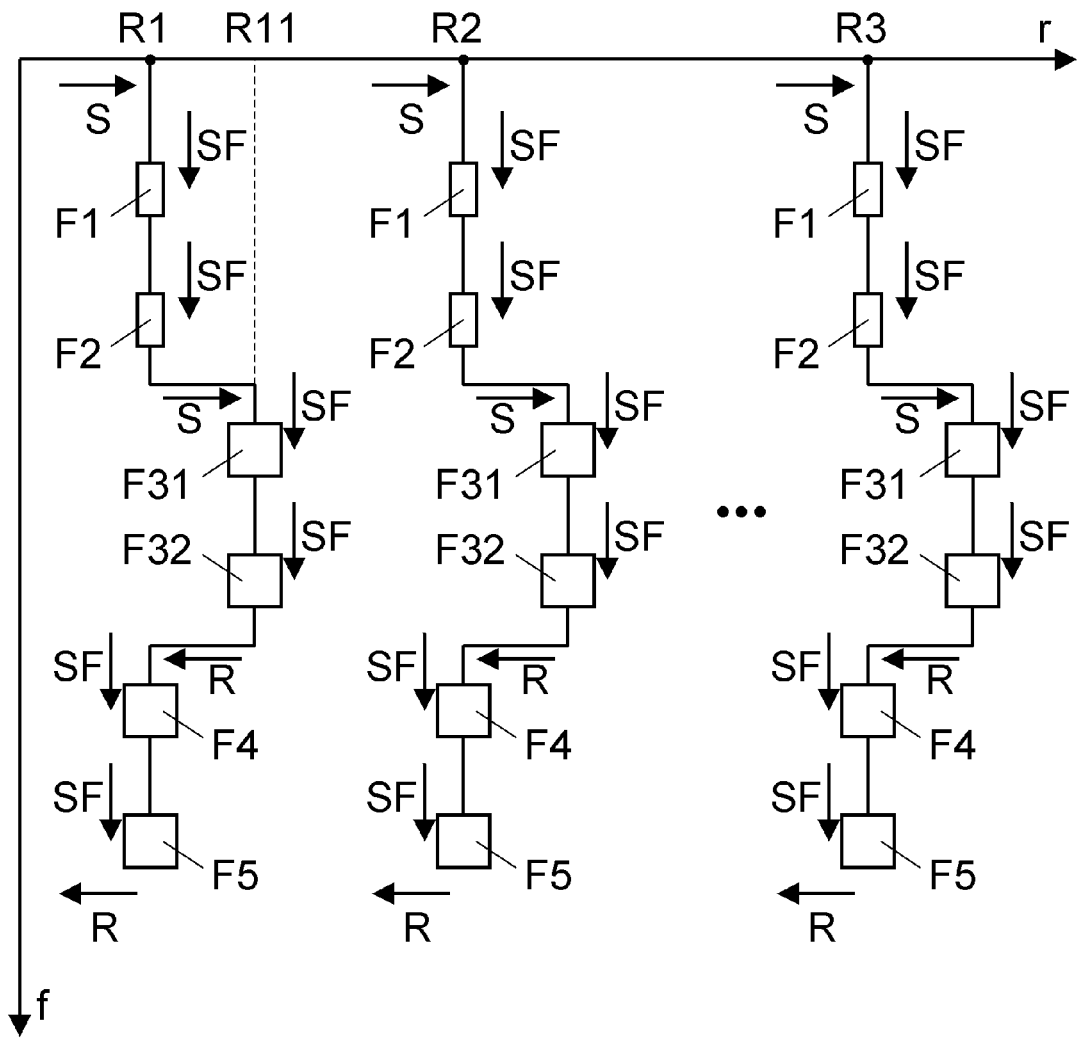
FIG. 6 shows a block diagram illustrating an example of processing variable data by stepping through data records field by field.

In the following paragraphs, described with reference to FIGS. 5 and 6 is an exemplary sequence of steps for generating the page-oriented data output from the variable data 20 for printing dynamic documents. In FIG. 5, reference numerals 1, 121, 122, and 13 refer to the data input module, the two data processing modules, and the layout module, as defined in the workflow configuration 17 of computer system 1. Specifically, data input module 11 is linked through the series of data processing modules 121 and 122 to layout module 13.

In step S1, the layout module 13 initiates generating the page-oriented data output from the variable data 20, e.g. by loading document layout and/or template definitions.

In step S2a, the layout module 13 initiates data processing by issuing a request for data to the preceding data processing module 122 linked directly to the layout module 13.

In step S2b, the data processing module 122 forwards the request for data received from the layout module 13 to the preceding data processing module 121 linked directly to the data processing module 122.

In step S2c, the data processing module 121 forwards the request for data received from the subsequent data processing module 122 to the preceding data input module 11 linked directly to the data processing module 121.

In step S3, data input module 11 loads the variable data 20 from the data store 2 into the local memory 16, as specified in the workflow configuration 17. Specifically, in step S3, data input module 11 determines from the workflow configuration 17 the data file and data fields to be loaded and processed. Moreover, the data input module 11 loads into the local memory 16 the specified data fields associated with the data file's first data record, or the specified data fields associated with one hierarchical level of the data record, based on the data structure defining the layout of the data record. As illustrated schematically in FIG. 6, the data input module 11 loads the data fields F1, F2, F31, F32, F4, F5 associated with record R1, or, alternatively data fields F1, F2 associated with the first hierarchical level of record R1. In FIG. 6, the variable data is illustrated schematically by showing its data records R1, R2, . . . , R3 along a horizontal (record) axis r, and a record's data fields F1, F2, F31, F32, F4, F5, which are specified to be accessed and processed, in the direction of vertical (field) axis f. The data input module 11 controls and drives sequential stepping through the variable data 20, record by record R1, R2, R3, and field by field F1, F2, F31, F32, F4, F5. For that purpose, the data input module 11 issues and forwards through the data processing modules 121, 122 to the layout module 13, sink commands S, set field commands SF and raise commands R, as illustrated in FIG. 6. Thus, the data input module 11 drives sequential and synchronous processing of the variable data 20.

In step S4a, the data input module 11 issues to the subsequent data processing module 121 a sink command S, indicating to the data processing module 121 that a data record R1 is being accessed.

In step S4b, the data processing module 121 forwards the sink command S to the subsequent data processing module 122 linked directly to the data processing module 121.

In step S4c, the data processing module 122 forwards the sink command S to the layout module 13 linked directly to the data processing module 122.

In step S5, the data input module 11 determines a pointer to the variable data loaded in the local memory 16.

In step S6a, the data input module 11 issues to the subsequent data processing module 121 a set field command SF. The set field command SF includes the pointer to the variable data loaded in the local memory 16 and an index to the first data field F1, indicating to the data processing module 121 that data field F1 is being passed (by reference).

In step S6b, based on its workflow configuration data, the data processing module 121 determines whether it is specified to process the data field F1 referenced by the set field command SF received in step S6a. In the present example, data processing module 121 is not specified to process data field F1, and data processing module 121 continues in step S6c without reading data field F1 from the local memory 16.

In step S6c, data processing module 121 forwards to the subsequent data processing module 122 the set field command SF received in step S6a.

In step S6d, based on its workflow configuration data, the data processing module 122 determines whether it is specified to process the data field F1 referenced by the set field command SF received in step S6c. In the present example, data processing module 122 is not specified to process data field F1, and data processing module 122 continues in step S6e without reading data field F1 from the local memory 16.

In step S6e, data processing module 122 forwards to layout module 13 the set field command SF received in step S6c.

In step S7, the layout module 13 reads the value of data field F1 from the local memory 16, using the pointer received with the set field command SF in step S6e. Using the pointer, the layout module 13 determines the location of the data field F1 in the local memory 16. Based on information about the data structure of the data records R1, R2, R3, the layout module 13 uses the index received with the set field command SF to identify the current field in the current data record R1 as data field F1, in connection with the previous sink command S. Moreover, based on its workflow configuration data and for generating the page-oriented data output, the layout module 13 associates the unprocessed data field F1 with a respective location or placeholder of the defined document layout or template.

In step S8a, the data input module 11 issues to the subsequent data processing module 121 a set field command SF whereby the pointer to the variable data includes an index to the next data field F2, thereby, passing data field F2 by reference to data processing module 121.

In step S8b, based on its workflow configuration data, in the present example, the data processing module 121 determines that it is specified to process the data field F2 referenced by the set field command SF received in step S8a.

In step S8c, data processing module 121 reads the value of data field F2 from the local memory 16 and generates a pre-processed version of data field F2 by applying operations to the data field F2 as specified in the workflow configuration data associated with data processing module 121, e.g. by reformatting data field F2. The data processing module 121 uses the pointer to determine the location of the data field F2 in the local memory 16. Based on information about the data structure of the data records R1, R2, R3, the data processing module 121 uses the index, in connection with the previous sink command S, to identify the current field in the current data record R1 as data field F2. Furthermore, data processing module 121 stores the pre-processed (reformatted) data field F2 in the local memory 16, and determines a pointer to the pre-processed data field F2 in the local memory 16. Alternatively, for multi-field operations that apply to more than one data field, the data processing module 121 stores a copy of the unprocessed data field F2 in the local memory 16. For multi-field operations, processing of the respective data fields takes place when the set field command refers to the last data field required for the multi-field operation, and the data processing module 121 has read the values of all required data fields from the local memory 16. Subsequently, the data processing module 121 stores the data value resulting from performing the multi-field operation in the local memory 16, and determines a pointer to the data result in the local memory 16.

In step S8d, data processing module 121 replaces the pointer in the set field command SF of step S8a with the pointer referring to the pre-processed data field F2 (or the result of a multi-field operation), and forwards the altered set field command SF to the subsequent data processing module 122 (keeping the index set to data field F2).

In step S8e, based on its workflow configuration data, the data processing module 122 determines that, in the present example, it is not specified to process the data field F2 referenced by the set field command SF received in step S8d, and continues in step S8f without reading the pre-processed data field F2 from the local memory 16.

In step S8f, data processing module 122 forwards to layout module 13 the set field command SF received in step S8d.

In step S9, the layout module 13 reads the value of the pre-processed data field F2 from the local memory 16, using the pointer received with the set field command SF in step S8f to determine the location of the pre-processed data field F2 in the local memory 16. Moreover, based on its workflow configuration data and for generating the page-oriented data output, the layout module 13 associates the pre-processed data field F2 with the respective location or placeholder of the defined document layout or template, using the index received with the set field command SF to identify the current field in the current data record R1 as data field F2.

In step S10, if not all specified data fields of data record R1 were loaded in step S3, the data input module 11 loads the data fields F31, F32 associated with the lower hierarchical level R11 of data record R1 from the data store 2 into the local memory 16, as specified in the workflow configuration 17.

In step S11a, the data input module 11 issues to the subsequent data processing module 121 a sink command S, indicating to the data processing module 121 that a lower hierarchical level of data record R1 is being accessed.

In steps S11b and S11c, the sink command S is forwarded by data processing module 121 through data processing module 122 to the layout module 13.

In step S12, depending on the embodiment, the data input module 11 determines a pointer to the hierarchically lower data fields F31, F32 loaded in the local memory 16.

In step S13a, the data input module 11 issues to the subsequent data processing module 121 a set field command SF with a pointer and index to data field F31.

In step S13b, based on its workflow configuration data, in the present example, the data processing module 121 determines that it is specified to process the data field F31 referenced by the set field command SF received in step S13a.

In step S13c, data processing module 121 reads the value of data field F31 from the local memory 16, using the pointer included in the set field command of step S13a, generates a pre-processed version of data field F31 as specified in the respective configuration data, stores the pre-processed data field F31 in the local memory 16, and determines a pointer to the pre-processed data field F31 in the local memory 16. Alternatively, for a multi-field operation, data processing module 121 reads the value of data field F31 from the local memory 16, stores a copy of the unprocessed data field F31 for processing when all required fields are retrieved, or performs the multi-field operation, if all required data fields are known, and stores the result from the multi-field operation in the local memory 16.

In step S13d, data processing module 121 replaces the pointer in the set field command SF of step S13a with the pointer referring to the pre-processed data field F31 (or the result of a multi-field operation), and forwards the altered set field command SF to the subsequent data processing module 122 (keeping the index set to data field F31).

In step S13e, based on its workflow configuration data, in the present example, the data processing module 122 determines that it is specified to process the data field F31 referenced by the set field command SF received in step S13d.

In step S13f, data processing module 122 reads the value of the pre-processed data field F31 from the local memory 16, using the pointer included in the set field command of step S13d, generates a further processed version of pre-processed data field F31 as specified in the respective configuration data, stores the further processed data field F31 in the local memory 16, and determines a pointer to the further processed data field F31 in the local memory 16. Alternatively, the data processing module 122 may store or process the value of data field F31 as part of a multi-field operation.

In step S13g, data processing module 122 replaces the pointer in the set field command SF of step S13d with the pointer referring to the further processed data field F31 (or the result of a multi-field operation), and forwards the altered set field command SF to the layout module 13 (keeping the index set to data field F31).

In step S14, the layout module 13 reads the value of the further processed data field F31 from the local memory 16, using the pointer received with the set field command SF in step S13g. Moreover, based on its workflow configuration data and for generating the page-oriented data output, the layout module 13 associates the further processed data field F31 with the respective location or placeholder of the defined document layout or template, using the index received with the set field command SF to identify the current field in the current data record R1 as data field F31.

In subsequent steps, data field F32 is processed accordingly and, in steps S15a, S15b and S15c, a raise command R is issued by the data input module 11 and forwarded through the subsequent data processing modules 121, 122 to the layout module 13, indicating that a higher hierarchical level of data record R1 is being accessed.

In further steps, data fields F4 and F5 are processed accordingly, and having reached the last data field of data record R1 to be processed, in step S16, data input module 11 determines whether there are further records of the variable data 20 to be processed. If there are further data records R2, R3 to be processed, processing continues in step S3; otherwise, processing continues in step S17a.

In steps S17a, 17b, 17c, a raise command R is issued by the data input module 11 and forwarded through the subsequent data processing modules 121, 122 to the layout module 13, indicating that the end of the variable data has been reached and all data records have been processed.

In step S18, the layout module 13 generates the page-oriented data output from the unprocessed and pre-processed variable data read in the previous steps S7, S9, S14, and the respective document layout and/or template definitions.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

What is claimed is:

1. A computer-implemented method of generating, from variable data stored in a data store, page-oriented data output for printing dynamic documents, the method comprising:
   providing a series of serially connected data processing modules,
   linking in a computer a layout module to a data input module through the series of serially connected data processing modules;
   assigning to the serially connected data processing modules a specification of one or more data fields to be processed by each respective data processing module;
   loading a part of the variable data by the data input module from the data store into local memory of the computer;
   passing a pointer to the variable data loaded by the data input module from the data input module to a first data processing module in the serially connected data processing modules linked to the data input module;
   determining by the first data processing module linked to the data input module whether a first data field from the variable data in the local memory is assigned to be pre-processed by the first data processing module;
   passing the pointer received from the data input module to a second data processing module in the series of serially connected data processing modules if the first data processing module determines that the first data field is not assigned to be processed by the first data processing module;
   reading and pre-processing the first data field, storing the pre-processed first data field in the local memory and passing a pointer to the pre-processed first data field to the second data processing module by the first data data processing module if the first data processing module determines that the first data field is assigned to be pre-processed only by the first data processing module;
   receiving by the layout module pointers to the variable data and to pre-processed variable data from the data processing modules linked to the layout module, and
   generating the page-oriented data output by the layout module from pre-processed variable data and variable data loaded by the data input module, using the pointers.

2. The method of claim 1, wherein, in cases where the data field is configured to be processed by the respective data processing module, the respective data processing module stores the pre-processed variable data in the local memory separate from the variable data loaded by the data input module, and uses a pointer to the pre-processed variable data for passing the pre-processed variable data by reference to the layout module.

3. The method of claim 1, wherein, in cases where the respective data processing module is configured to perform a combined operation on more than data field, the respective data processing module generates pre-processed variable data from these data fields, stores the pre-processed variable data in the local memory, and uses a pointer to the pre-processed variable data for passing the pre-processed variable data by reference to the layout module.

4. The method of claim 1, wherein the variable data is loaded from the data store record by record and at least one data field of a record is loaded at a time; the variable data is passed field by field by the data input module through the data processing modules to the layout module, using in each case a pointer to the data field loaded in the local memory, the data processing modules reading the loaded data field from the local memory only in cases where the loaded data field is configured to be processed by the respective data processing module, and in such cases the respective data processing module generates from one or more of the loaded data fields a pre-processed data field, stores the pre-processed data field in the local memory, and uses a pointer to the pre-processed data field, instead of the pointer to the loaded data field, for passing the pre-processed data field by reference to the layout module, and the layout module generates the page-oriented data output from loaded data fields and pre-processed data fields associated with a record.

5. The method of claim 1, wherein the variable data is loaded from the data store record by record, each data record having a hierarchical structure; data fields associated with one hierarchical level of a record are loaded into the local memory at a time; and an indication of the current hierarchical level is communicated from the data input module through the data processing modules to the layout module.

6. The method of claim 5, wherein the current hierarchical level is communicated by the data input module forwarding through the data processing modules to the layout module sink commands for descending to a lower hierarchical level, and raise commands for ascending to a higher hierarchical level.

7. The method of claim 1, wherein the variable data is loaded from the data store record by record, the data processing modules are provided with information about the structure of the record, and the pointer includes an index for identifying a data field with reference to the structure of the record.

8. The method of claim 1, wherein a request for data is forwarded from the layout module through the data processing modules to the data input module, and the data input module loads the variable data from the data store into local memory in response to the request for data.

9. A computer system for generating, from variable data stored in a data store, page-oriented data output for printing dynamic documents, the system comprising
   a data input module,
   a plurality of data processing modules connected in series, and
   a layout module;
   the layout module being linked in series with the data processing modules to the data input module;
   the data input module being configured to load a part of the variable data from the data store into local memory, and to pass the variable data by reference through the data processing modules to the layout module, using in each case a pointer to the part of the variable data loaded in the local memory;

each respective data processing module being assigned to read an assigned data field from the variable data in the local memory;

each data processing module is configured to determine whether the pointer received from the data input module refers to an assigned data field and to read the data field if the received pointer references an assigned data field, to generate and store in the local memory pre-processed variable data from the variable data of the read data field, to pass a pointer to the pre-processed variable data in the local memory to the layout module if the pointer received from the data input module refers to an assigned data field, and to pass the pointer received from the data input module to the la out module if the received pointer does not refer to an assigned data field; and the layout module being further configured to generate the page-oriented data output from pre-processed variable data and variable data loaded by the data input module using the pointers received from the data processing modules linked to the layout module.

10. The computer system of claim 9, wherein the data processing modules are configured, in cases where the respective data field is configured to be processed by the respective data processing module, to store the pre-processed variable data in the local memory separate from the variable data loaded by the data input module, and to use a pointer to the pre-processed variable data for passing the pre-processed variable data by reference to the layout module.

11. The computer system of claim 9, wherein the data processing modules are configured, in cases where more than one data field is configured to be processed in combination by the respective data processing module, to generate pre-processed variable data from these data fields, to store the pre-processed variable data in the local memory, and to use a pointer to the pre-processed variable data for passing the pre-processed variable data by reference to the layout module.

12. The computer system of claim 9, wherein the data input module is configured to load the data from the data store record by record and at least one data field of a record at a time, to pass the variable data field by field through the data processing modules to the layout module, using in each case a pointer to the data field loaded in the local memory; the data processing modules are configured to read the loaded data field from the local memory only in cases where the loaded data field is configured to be processed by the respective data processing module, and in such cases to generate from one or more of the loaded data fields a pre-processed data field, to store the pre-processed data field in the local memory, and use a pointer to the pre-processed data field, instead of the pointer to the loaded data field, for passing the pre-processed data field by reference to the layout module; and the layout module is further configured to generate the page-oriented data output from loaded data fields and pre-processed data fields associated with a record.

13. The computer system of claim 9, wherein the data input module is configured to load the data from the data store record by record, each data record having a hierarchical structure, data fields associated with one hierarchical level of a record being loaded into the local memory at a time, and to communicate an indication of the current hierarchical level through the data processing modules to the layout module.

14. The computer system of claim 13, wherein the data input module is configured to communicate the current hierarchical level by forwarding through the data processing modules to the layout module sink commands for descending to a lower hierarchical level, and raise commands for ascending to a higher hierarchical level.

15. The computer system of claim 9, wherein the data input module is configured to load the variable data from the data store record by record, the data processing modules are provided with information about the structure of the record, and the pointer includes an index for identifying a data field with reference to the structure of the record.

16. The computer system of claim 9, wherein the layout module is configured to issue a request for data to the data processing module linked to the layout module; the data processing modules are configured in each case to forward the request for data to the data processing module or the data input module linked to the respective data processing module; and the data input module is configured to load the variable data from the data store into local memory in response to the request for data.

17. A computer program product comprising a tangible non-transitory computer-readable medium comprising computer program code means, the computer program code means being configured to control one or more processors of a computer system such that the computer system:

links in the computer system a layout module in series with a plurality of data processing modules to a data input module the plurality of data processing modules being connected in series, loads for the data input module a part of variable data from a data store into local memory; passes the variable data by reference from the data input module through the data processing modules to the layout module using a pointer to the part of variable data loaded in the local memory; assigns a data field to each data processing module; in each data processing module, determines whether a pointer received from the data input module refers to an assigned data field; with each data processing module, reads, pre-processes and stores in the local memory pre-processed variable data of an assigned data field; from each data processing module, passes a pointer to the data field if the pointer received from the data input module does not refer to an assigned data field and passes a pointer to the pre-processed variable data if the pointer received from the data input module refers to an assigned data field; and generates, for printing dynamic documents, page-oriented data output for the layout module from pre-processed variable data and variable data loaded for the data input module using the pointers from the data processing modules linked to the layout module.

18. A computer system for generating, from variable data stored in a data store, page-oriented data output for printing dynamic documents, the system comprising a data input module, a plurality of data processing modules connected in series, a layout module, and an output module;

the layout module being linked in series with the data processing modules to the data input module;

the data input module being configured to load a part of the variable data from the data store into local memory, and to pass the variable data by reference through the data processing modules to the layout module, using a pointer to the part of the variable data loaded in the local memory;

each respective data processing module being assigned to read an assigned data field from the variable data in the local memory;

each data processing module is configured to determine whether the pointer received from the data input module refers to an assigned data field and to read the data field if the received pointer references an assigned data field, to generate and store in the local memory pre-processed variable data from the variable data of the read data field, to pass a pointer to the pre-processed variable data in the local memory to the layout module if the pointer received from the data input module refers to an assigned data field, and to pass the pointer received from the data input module to the layout module if the received pointer does not refer to an assigned data field;

the layout module being further configured to generate the page-oriented data output from pre-processed variable data and variable data loaded by the data input module using the pointers received from the data processing modules linked to the layout module; and the output module being configured to output at least one dynamic document based on the page-oriented data output to at least one of a printer and a display.

19. A computer program product comprising a tangible non-transitory computer-readable medium comprising computer program code means, the computer program code means being configured to control one or more processors of a computer system such that the computer system links in the computer system a layout module in series with a plurality of data processing modules to a data input module the data processing modules being connected in series, loads for the data input module a part of variable data from a data store into local memory;

passes the variable data by reference from the data input module through the data processing modules to the layout module using a pointer to the part of variable data loaded in the local memory; assigns a data field to each data processing module; in each data processing module, determines whether a pointer received from the data input module refers to an assigned data field; with each data processing module, reads, pre-processes and stores in the local memory pre-processed variable data of an assigned data field; from each data processing module, passes a pointer to the data field if the pointer received from the data input module does not refer to an assigned data field and passes a pointer to the pre-processed variable data if the pointer received from the data input module refers to an assigned data field, generates, for printing dynamic documents, page-oriented data output for the layout module from pre-processed variable data and variable data loaded for the data input module using the pointers from the data processing modules linked to the layout module; and outputs at least one dynamic document based on the page-oriented data output to at least one of a printer and a display.

20. A computer-implemented method of generating, from variable data stored in a data store, page-oriented data output for printing dynamic documents, the method comprising:

providing a series of serially connected data processing modules, linking in a computer a layout module to a data input module through the series of serially connected data processing modules;

assigning to the serially connected data processing modules a specification of one or more data fields to be processed by each respective data processing module;

loading a part of the variable data by the data input module from the data store into local memory of the computer;

passing a pointer to the variable data loaded by the data input module from the data input module to a first data processing module in the serially connected data processing modules linked to the data input module;

determining by the first data processing module linked to the data input module whether a first data field from the variable data in the local memory is assigned to be pre-processed by the first data processing module;

passing the pointer received from the data input module to a second data processing module in the series of serially connected data processing modules if the first data processing module determines that the first data field is not assigned to be processed by the first data processing module;

reading and pre-processing the first data field, storing the pre-processed first data field in the local memory and passing a pointed to the pre-processed first data field to the second data processing module by the first data processing module if the first data processing module determines that the first data field is assigned to be pre-processed only by the first data processing module;

receiving by the layout module pointers to the variable data and to pre-processed variable data from the data processing modules linked to the layout module, generating the page-oriented data output by the layout module from pre-processed variable data and variable data loaded by the data input module, using the pointers;

outputting at least one dynamic document based on the page-oriented data output to at least one of a printer and a display.

* * * * *